United States Patent [19]

Farmer et al.

[11] Patent Number: 5,202,694
[45] Date of Patent: Apr. 13, 1993

[54] P-CODE GENERATION

[75] Inventors: Dominic Farmer, Mountain View; Kreg Martin, Cupertino, both of Calif.

[73] Assignee: Trimble Navigation, Sunnyvale, Calif.

[21] Appl. No.: 757,332

[22] Filed: Sep. 10, 1991

[51] Int. Cl.$^5$ .......................... H04B 7/185; G01S 5/02
[52] U.S. Cl. ...................... 342/357; 380/46; 375/1; 364/717
[58] Field of Search ............. 342/357, 352, 356; 380/46; 375/1; 364/717

[56] References Cited

U.S. PATENT DOCUMENTS

| | | |
|---|---|---|
| 4,463,357 | 7/1984 | MacDoran . |
| 4,870,422 | 9/1989 | Counselman . |
| 4,928,106 | 5/1990 | Ashjaee et al. ...................... 342/352 |
| 4,928,107 | 5/1990 | Kuroda et al. . |
| 5,031,129 | 7/1991 | Powell et al. ...................... 364/717 |

Primary Examiner—Theodore M. Blum
Attorney, Agent, or Firm—John Schipper

[57] ABSTRACT

Improved apparatus for generation of the P-code sequences used in global positioning by issuance and sensing of code sequences issued by a plurality of satellites. The improved apparatus generates the same P-code sequences with fewer components, or with different components, by removal or replacement of: (1) a time delay/multiplexer module that allows choice of the satellite whose P-code is being formed and issued; (2) four 12-bit counters that determine the end of an epoch and are associated with four X code registers; (3) components that produce precession of an X1 code sequence relative to an X2 code sequence; and (4) an end-of-the-period counter, used to sense occurrence of the end of a chosen period, for example, 7.0 days, for purpose of P-code re-initialization.

24 Claims, 6 Drawing Sheets

P-CODE GENERATION

FIELD OF THE INVENTION

This invention relates to improvements in apparatus for generation of a P code, used in determining position on the Earth's surface with a global positioning system.

BACKGROUND OF THE INVENTION

The Navstar Global Positioning System ("GPS") is a satellite-based radio navigation system that allows a user to accurately determine its three-dimensional position, velocity and acceleration vectors on the Earth's surface, in addition to measuring precise time of such measurements. GPS consists of three separate parts or segments. The Control Segment monitors and controls the satellites and is responsible for uploading the satellite messages. The Space Segment consists of the satellites themselves. When GPS achieves full operational status, the Space Segment will include 21 satellites in 6 orbital planes, plus 3 spare satellites (also orbiting) designed to maximize satellite-to-user visibility. The User Segment consists of a GPS receiver and any applications for which the GPS receiver may be used.

The satellites transmit to the User segment using two carrier signal frequencies, centered at 1575.42 MHz (L1 carrier) and at 1227.6 MHz (L2 carrier). Both the L1 and L2 carrier signal frequencies carry binary phase shift keying ("BPSK") modulation, which is discussed in W. Tomasi, *Electronic Communication Systems*, Prentice-Hall, 1988, pp. 496–502. The L1 carrier signal is modulated by the P code and by the C/A code. The L2 carrier signal is modulated by the P code only. The C/A code is clocked at 1.023 MHz and its sequence repeats every 1023 chips, giving the C/A code a period of 1 msec. The P code is clocked at 10.23 MHz and has a code period of precisely 1 week (7.000 days). By assigning different C/A and P code sequences to different satellites, the user can select a particular satellite signal by using the codes associated with that satellite vehicle's Pseudo Random Number Code ("PRN").

A code-correlating receiver generates a replica of the code transmitted by the satellite. This is used to strip off the BPSK modulation and leave the original carrier signal plus navigation data. The phase of the local PRN code signal allows a measurement of the satellite Pseudo Range, which is defined as the measured range to a satellite, uncorrected for synchronization errors between the receiver and satellite clocks. The C/A code receivers use the L1 signal only, but receivers that are capable of P code operation can use both the L1 and the L2 signals. This allows the P code receivers to measure and apply a dual frequency correction to delays induced by the ionosphere, in a manner disclosed by MacDoran in U.S. Pat. No. 4,463,357.

Counselman, in U.S. Pat. No. 4,870,422, discloses method and apparatus for a Global Positioning System that uses double sideband, suppressed carrier signals and relies on in-phase and quadrature output signals from one or more local oscillators to determine position relative to two or more satellites. This approach appears to contemplate only a conventional approach to P code generation and sensing. Ashjaee et al also disclose use of local oscillators and frequency-shifted signals for global position determination, in U.S. Pat. No. 4,928,106. Kuroda et al, in U.S. Pat. No. 4,928,107, disclose a Global Positioning System involving iterative determination of global position from receipt of GPS signals from a plurality of satellites.

The conventional method of producing the C/A and P code sequences is given in the Interface Control Document, ICD-GPS-200, Rockwell International Corp., Satellite Systems Division, Revision A, Sep. 26, 1984, incorporated herein by reference. The P code circuit consists of two codes, called the X1 code and the X2 code. The satellite PRN selection is performed by delaying the X2 code relative to the X1 code by one or more chips. Delays of 1 to 37 chips are defined, which allows generation of code sequences 1 through 37. The X1 code consists of 15,345,000 chips which, when clocked at 10.23 MHz, has a repetition period of precisely $\Delta t = 1.5$ seconds. The boundary between the last X1 code chip and the first X1 code chip of the following cycle is called an X1 epoch. The X2 code sequence consists of 15,345,037 chips, making it 37 chips longer than the X1 code sequence. This allows the X1 code to precess relative to the X2 code by 37 chips every 1.5 seconds.

Each of the X1 and X2 codes is produced by an Exclusive OR ("EX-OR") operation applied to two shorter length code sequences. The X1 code results from EX-ORing X1A code and X1B code. The X2 is made from EX-ORing an X2A code and an X2B code. The X1A, X1B, X2A and X2B codes are short cycled, maximal length PRN sequences that are generated using four 12-bit shift registers. The X1A and X2A code sequences are 4092 chips long and the X1B and X2B sequences are 4093 chips long. The short cycling of the PRN registers is performed by detecting the final state in the register sequence and initializing the register with the first state in the sequence. The transistion from final state to first state is termed the PRN code epoch.

Mathematically, this is represented as follows:

$$P(t;n) = X1(t) \oplus X2(t - nT) \quad (n = 1, 2, \ldots, 37), \tag{1}$$

$$X1(t) = X1A(t) \oplus X1B(t), \tag{2}$$

$$X2(t) = X2A(t) \oplus X2B(t). \tag{3}$$

$$T = (10.23 \text{ MHz})^{-1} = 97.752 \text{ nsec}, \tag{4}$$

$$CA(t; n) = G1(t) \oplus G2(t; n), \tag{5}$$

where P(t; n) represents the P code bit position amplitude as a function of time t for satellite no.n, CA(t; n) represents the C/A code bit position amplitude for satellite no.n, G1(t) and G2(t; n) are Gold Code sequences, with G2(t; n) time delayed by an amount $\Delta t_n$ relative to G1(t), and X1(t), X2(t), X1A(t), X1B(t), X2A(t) and X2B(t) have similar interpretations. Each of the X1A, X1B, X2A and X2B codes is generated by a 12-bit shift register with selective feed-through, and the associated feed-through polynomials P(X; x) (X=X1A, X1B, X2A and X2B are given by:

$$P(X1A; x) = 1 + x^6 + x^8 + x^{11} + x^{12}, \tag{6}$$

$$P(X1B; x) = 1 + x + x^2 + x^5 + x^8 + x^9 + x^{10} + x^{11} + x^{12}, \tag{7}$$

$$P(X2A; x) = 1 + x + x^3 + x^4 + x^5 + x^7 + x^8 + x^9 + x^{10} + x^{11} + x^{12}, \tag{8}$$

$$P(X2B; x) = 1 + x^2 + x^3 + x^4 + x^8 + x^9 + x^{12}. \tag{9}$$

Figure 1:
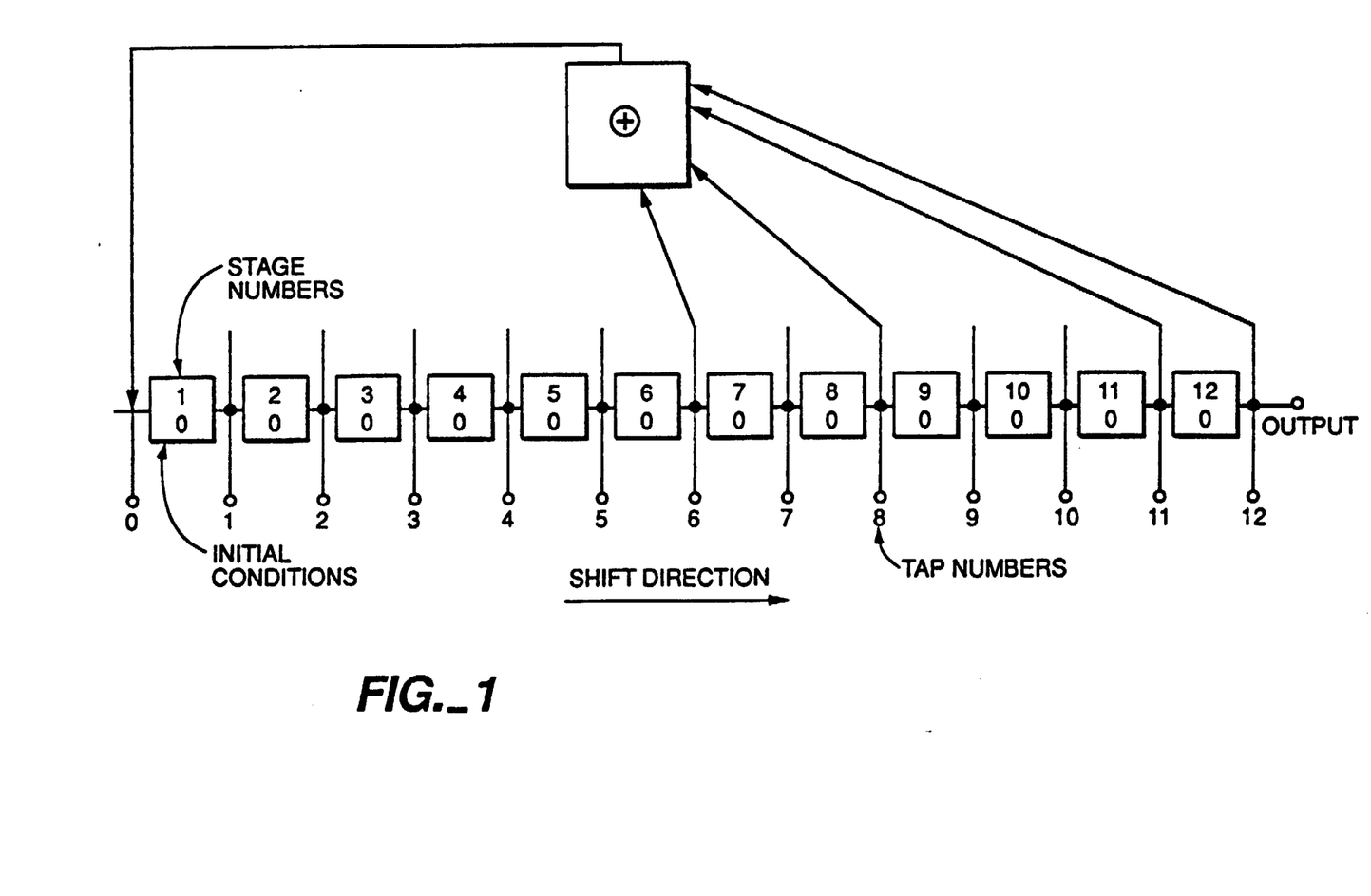
FIG. 1 is a schematic view illustrating the X1A shift register generator configuration.

The 12-bit register configuration for generating P(X1A; x) is illustrated in FIG. 1, and the register configurations for the other three feed-through polynomials are similar. The initial values of the 12-bit X1A, X1B, X2A and X2B codes, to which the respective codes are reset at the beginning of each week, are $$X1A(t=0)=001001001000, \quad (10)$$

$$X1B(t=0)=010101010100, \quad (11)$$

$$X2A(t=0)=100100100101, \quad (12)$$

$$X2B(t=0)=010101010100. \quad (13)$$

Figure 2:
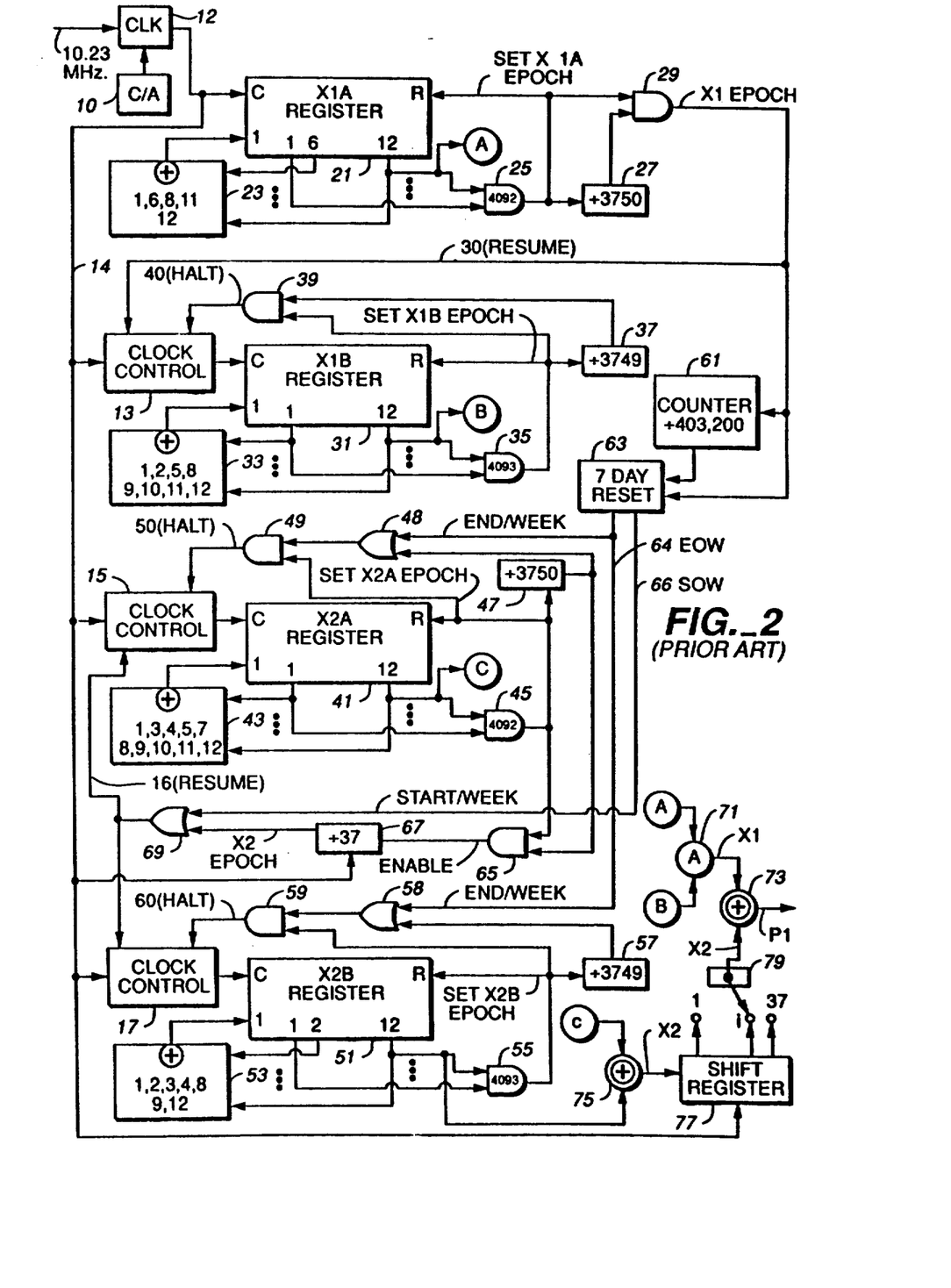
FIG. 2 is a schematic view illustrating use of the X1A, X1B, X2A and X2B registers and associated decoders, counters and logic gates to generate the P-code by conventional means.

Each of the 12-bit PRN registers is paired with a state decoder and epoch counter, as illustrated in FIG. 2. Each of the X1A and X2A PRN generators has a divide-by-3750 counter paired with it, and each of the X1B and X2B PRN generators has a divide-by-3749 counter paired with it. Unlike the X1A register, which is clocked continuously, the X1B, X2A and X2B registers can be stopped and restarted upon receipt of "halt counting" and "resume counting" signals, respectively. The halt conditions occur in the following manner. (1) After initialization, the X1B register, decoder and counter operate normally until they reach their final states. This occurs 343 chips before the next X1A epoch; the X1B circuitry is held in this final state until the next X1A epoch occurs, when normal operation is resumed. (2) The X2B register, decoder and counter operate normally until these devices reach their respective final states, after which the contents of these devices are held for 343 chips relative to the X2A register, decoder and counter in a similar manner. However, when the next X2A epoch occurs, both the X2A and X2B devices are held in their respective final states for an additional 37 chips. This allows the X1 code to precess relative to the X2 code by 37 chips within each X1 period. Implementation of the ICD-GPS-200 specification requires a divide-by-37 counter to time this 37-chip delay. (3) During the last 400 μsec before the end of the week, the X2A and X2B registers are clocked normally until they reach their final states, where they are held until the first X1A epoch of the next week begins. All PRN registers and counters are reset to their initial states when the new week begins, and the X1A and X1B circuits operate normally across this time point.

FIG. 2 illustrates conventional apparatus 11 for generation of the P code. The apparatus is driven by receipt, on a clock signal line 14, of a sequence of clock pulse signals produced by a 10.23 MHz clock pulse source 12 that can be enabled by the C/A code epoch signal from the C/A module 10. A 12-bit X1A register 21, with associated feed-through polynomial module 23, receives the clock pulse sequence directly and generates a 12-bit register state with a chosen bit position that has an associated code sequence X1A(t) for each of a sequence of times $t=mT$ ($m=0, 1, 2, \ldots, M$). The X1A code cycles through 4092 chips in a single X1A period. The X1 period has length $\Delta t=1.5$ sec $=(15,345,000$ chips)/(10.23 MHz). Each state is monitored by an X1A cycle decoder 25 that issues an X1A epoch signal each time the chip number reaches 4092. The X1A epoch signal resets the X1A PRN signal to its initial value. This output signal from the decoder 25 is received by a divide-by-3750 X1A counter 27 that issues a predetermined divider output signal when the X1A epoch count reaches 3750. The output signal from the X1A counter 27 is received by one of two input terminals of an AND gate 29. The other input terminal of the AND gate 29 receives the output signal from the decoder 25. When the two input signals for the AND gate 29 are both high, which occurs only at the end of each X1 period, the output signal of the AND gate 29 goes high and an X1 epoch output signal is issued. The X1 epoch signal issued by the AND gate 29 is received by a first input terminal (the "resume counting" terminal) of a clock control module 13 that receives and passes clock pulses to a register 31. The clock control module 13 is enabled by receipt of a high signal at its "resume counting" input terminal, which allows a sequence of clock pulses received at a clock input terminal to be passed through as an output signal, if the clock control module 13 is presently disabled. The clock control module 13 is disabled by receipt of a high signal at its "halt counting" input terminal. Receipt of the "halt counting" signal terminates pass-through of the clock pulse sequence received by the clock control module 13 until the next "resume counting" signal is received.

A 12-bit X1B register 31 and associated feed-through polynomial module 33 generates a 12-bit register state with a chosen bit position that has an associated code sequence X1B(t) for each of a sequence of times $t=mT$ ($m=0, 1, 2, \ldots, M$). As each new X1B code sequence is generated, the sequence is monitored by an X1B cycle decoder 35 that operates analogously to the X1A cycle decoder 25, except that the X1B cycle decoder 35 issues an X1B epoch output signal after 4093 chips. The X1B epoch output signal from the X1B cycle decoder 35 is received by a divide-by-3749 X1B epoch counter 37 that operates in a manner similar to the divide-by-3750 counter 27. The output signals from the X1B cycle decoder 35 and from the divide-by-3749 X1B epoch counter 37 are received by two input terminals of an AND gate 39 that issues a high output signal, once every (4093)×(3749)=15,344,657 chips. This high output signal from the AND gate 39 is received by a second input terminal (the "halt counting" terminal) of the clock control module 13 and disables this clock control module so that no further clock signal is received by the X1B register 31.

Receipt of a high input signal at the "halt counting" terminal of the clock control module 13 causes this module to suppress pass-through of the clock pulse sequence output that would otherwise be issued at its output terminal, as discussed above. Receipt of the "halt counting" signal by the clock control module 13 freezes the code output signal received from the X1B register by the decoder 35 at the value X1B(t=[15,345,000-343]T) until the time $t=15,345,000$ T, at which point the X1A and X1B code sequence developments continue without re-initialization. Re-enablement of the clock control module 13 occurs when this clock control module receives a "resume counting" signal from the AND gate 29 at a second input terminal of the clock control module 13, and this occurs at the end of each X1 period, as described above ($\Delta t=1.5$ sec).

The X2A register 41 and the X2B register 51 behave analogously to the X1A register 21 and the X1B register 31, respectively. The X2A register 41 is a 12-bit register with associated feed-through polynomial module 43 that together generate a 12-bit register state with a chosen bit position that has an associated code sequence X2A(t). As the code sequence X2A(t) is generated, the X2A register 41 cycles through 4092 chips a total of 3750 times in an X2 period of length Δt=1.5 sec. The output state from the X2A register 41 is passed through a 4092-chip decoder 45, which produces an X2A epoch output signal, and then through a divide-by-3750 counter 47. The output signal from the counter 47 is received by one of two input terminals of an OR gate 48, whose second input terminal receives an EOW signal indicating when the end of a week or other designated overall period has occurred. If either of these two input signals for the OR gate 48 is high, the OR gate output signal will be high. The output signal from the OR gate 48 is received by one of two input terminals of an AND gate 49, whose second input terminal receives the output signal from the X2A epoch decoder module 45. The output signal from the AND gate 49 is high only when: (1) the end of a 4092-chip cycle is reached; and (2a) the end of an X2A period is reached (Δt=1.5 sec) or (2b) an end-of-week signal EOW is received. Receipt of a high output signal from the AND gate 49 at a "halt counting" terminal of a second clock control module 15 commands this module to halt its clock pulse pass-through operation, until a "resume counting" signal is received on a control line 16 at a "resume counting" terminal of the module 15. The "resume counting" signal commands resumption of pass through by the clock control module 15 of clock pulses received from the clock pulse source 12.

In a similar manner, an X2B register 51, an associated feed-through polynomial module 53, a 4093-state decoder 55, a divide-by-3749 X2B epoch counter 57, a two-input terminal OR gate 58 and a two-input terminal AND gate 59 generate the 3749×4093=15,344,657 chips of the X2B code. The OR gate 58 receives the EOW signal and an output signal from the X2B epoch counter 57 at its two input terminals. The AND gate 59 receives the output signal from the 4093-chip decoder 55 and the output signal from the OR gate 58 at its two input terminals. The output signal from the AND gate 59 is received by a "halt counting" input terminal of a third clock control module 17 and halts the clock pulse pass-through operations of the clock control module 17 when: (1) the end of a 4093-chip period is reached in the X2B register 51; and either (2a) the end of an X2B period is reached or (2b) an EOW signal is received. The clock control module 17 resumes its clock pulse pass-through operations when this module receives a "resume counting" signal on control line 16.

A divide-by-403,200 counter 61, sometimes referred to as an seven-day or Z counter, receives the X1 epoch signals from the AND gate 29 and issues a high output signal (EOW) after receipt of 403,199 consecutive X1 epoch signals, indicating the start of the last X1 period of the current week. The end of the week occurs one X1 period later, after the counter 61 has received 403,200 consecutive X1 epoch signals. The X1 epoch signals are spaced Δt=1.5 sec apart so that the total time interval is 604,800 sec=7.000 days in the configuration shown here. This total time interval may be any convenient interval of reasonable length. The output signals from the seven-day counter 61 and from the AND gate 29 are received by a seven-day reset module 63, which issues an end of week signal EOW as an output signal on a first output signal line 64 when the last X1 period of the current week has begun and issues a start-of-week signal SOW on a second output signal line 66 when a new week begins. The EOW signal is received by the OR gates 48 and 58, as noted above.

The SOW signal is received by one of two input terminals of an OR gate 69 on the signal line 66 from the seven-day reset module 63. An AND gate 65 receives the output signals from the 4092-chip decoder 45 and from the X2A epoch divider module 47 and periodically issues an X2 epoch output signal, indicating that the end of an X2 period has been reached. The output signal from the AND gate 65 enables a divide-by-37 counter 67 that, in its enabled state, receives and counts clock pulse input signals from the clock pulse source 12 that drives the apparatus 11. After count 37 is reached by the enabled counter 67, this counter issues a high output signal that is received by a second input terminal of the OR gate 69. The OR gate 69 thus issues a high output signal whenever (1) the gate receives an SOW signal or (2) the gate receives a high signal from the divide-by-37 counter 67, 37 chips beyond the end of the current X2 period. The output signal from the OR gate 69 is received by the control line 16, which delivers a "resume counting" signal to each of the clock control modules 15 and 17 and causes these clock control modules to resume pass-through operations of the clock pulses received on the signal line 14 from the clock pulse source 12. The result of a temporary halt, for 37 chips, in clock pulse pass-through operations for the X2A and X2B registers is that the X1A and X1B registers precess by 37 chips relative to the X2A and X2B registers at the end of each X1 period (Δt=1.5 sec).

The code sequences X1A(t) and X1B(t) issued by the registers 21 and 31 are received at two input terminals of an EX-OR gate 71, whose output signal X1A(t) $\oplus$ X1B(t)=X1(t) is received by one of two input terminals of an EX-OR gate 73. The code sequences X2A(t) and X2B(t) issued by the registers 41 and 51 are received at two input terminals of a third EX-OR gate 75. The output signal X2A(t) $\oplus$ X2B(t)=X2(t) from the EX-OR gate 75 is received by a 37-place shift register 77 that has 37 output terminals, one such output terminal corresponding to each of the time delays $\Delta t_d = nT$ (n=1, 2, ..., 37). An operator-controllable 6-bit latch and multiplexer 79 determines which of the 37 time delays $\Delta t_d = nT$ is used to form the time sequence $X2(t-\Delta t_d)$ that issus as an output signal from the latch-/multiplexer 79. This output signal is received by a second input terminal of the EX-OR gate 73, which issues the desired output signal $X1(t) \oplus X2(t-\Delta t_d)$ that is the characteristic code for one satellite vehicle.

The apparatus shown in FIG. 2 can be modified but is representative of the complexity of the conventional approach to P code generation. The arrangement of a large number of registers, decoders, counters and logic gates seriatim builds in a considerable time delay, because of the accumulated gate delays and other device delays of such arrangements. Further, use of so many components reduces the reliability of the apparatus and the mean-time-to-failure. What is needed is simpler apparatus that produces the same P code with fewer serial components and with increased reliability.

SUMMARY OF THE INVENTION

These needs are met by the invention, which provides apparatus that either reduces the number of components needed to produce the same P code signal or replaces groups of components with simpler components. Components that produce redundant information are removed or replaced by simpler components. This approach allows elimination or replacement of: (1) a time delay/multiplexer module, used to choose which satellite vehicle's P code is being received; (2) four 12-bit counters that are used to determine the end of a period in the four X code registers; (3) part or all of the apparatus that introduces precession of the X1 code relative to the X2 code; and (4) an end-of-week counter that determines when a chosen period, for example, of length 7.0 days, ends for P code re-initialization purposes.

DESCRIPTION OF BEST MODE OF THE INVENTION

Figure 3:
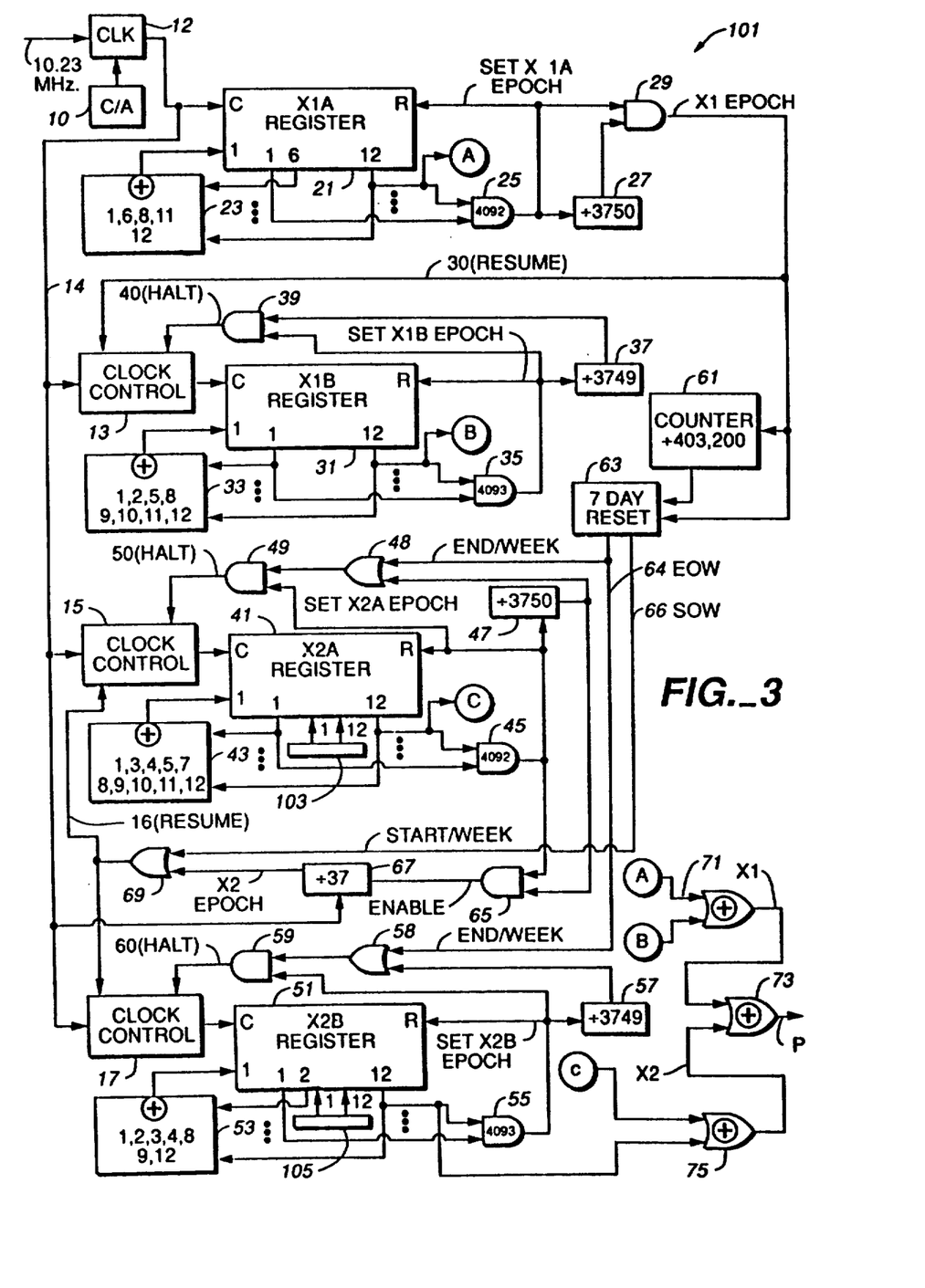
FIGS. 3-6 are schematic views illustrating embodiments of the invention in which the conventional apparatus shown in FIG. 2 is simplified.

FIG. 3 illustrates a first embodiment 101 of the invention, in which the shift register 77 and the latch/multiplexer 79 have been removed from the configuration shown in FIG. 2. These components allow an operator to select a time delay $\Delta t_d = nT$ ($n = 1, 2, \ldots, 37$) and to build this time delay into the X2 code sequence $X2(t - \Delta t_d)$ that is used to form the P code output signal $P(t) = X1(t) \oplus X2(t - \Delta t_d)$. In a first embodiment of the invention, the desired time delay in $X2(t)$ is produced instead by initializing the X2A and X2B code generators or registers to new initial states that are earlier, by $n$ chips, in each of the X2A and X2B groups of cycles (of lengths 4092 chip and 4093 chips, respectively). These choices of new initial code sequences $X2A0 = X2A(t = -\Delta t_d)$ and $X2B0 = X2B(t = -\Delta t_d)$ can be implemented by use of two initialization latches 103 and 105, respectively, connected to the respective registers 41 and 51 as shown, that determine the (new) initial states of the constants of these two registers.

Figures 4, 4A:
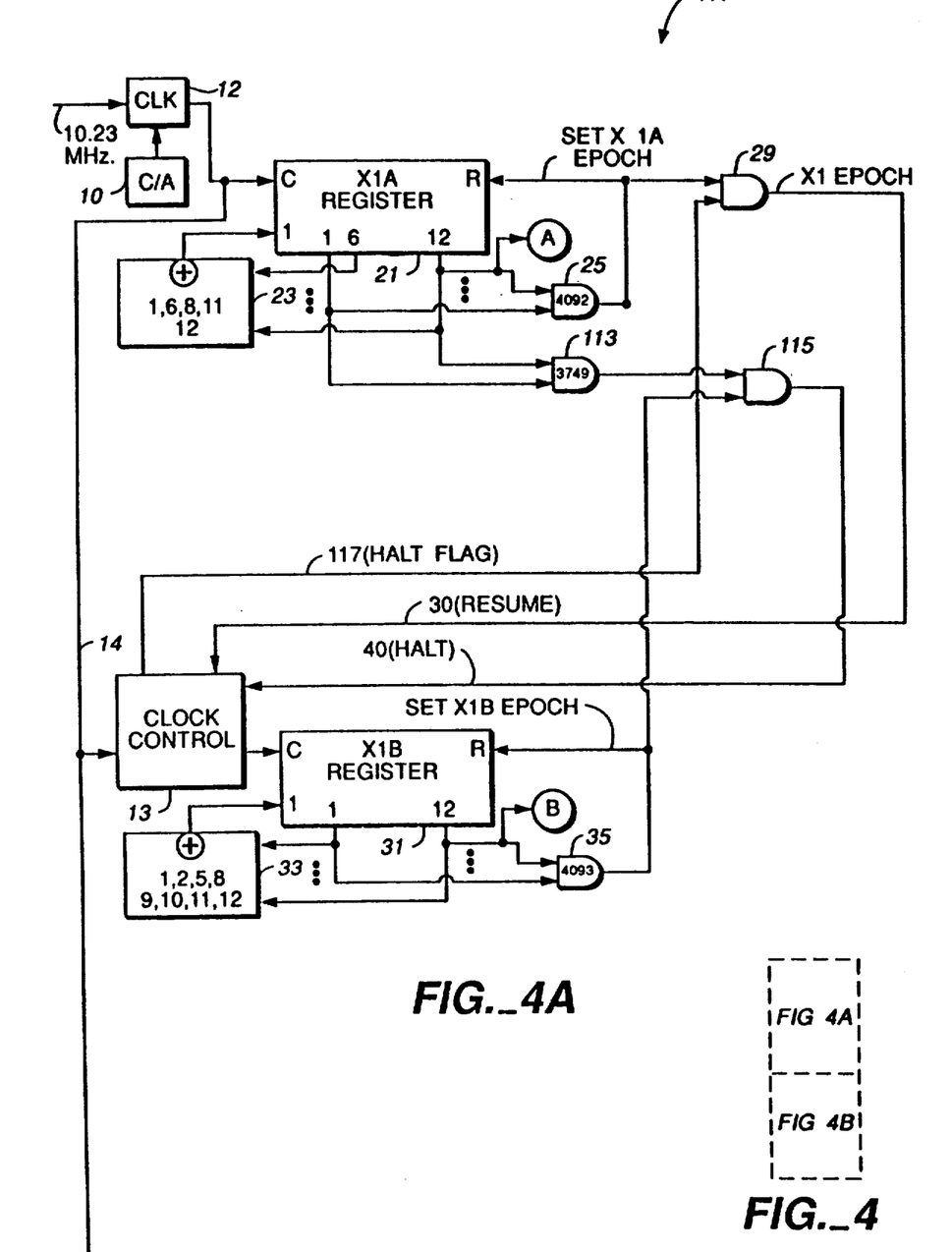
Figure 4B:
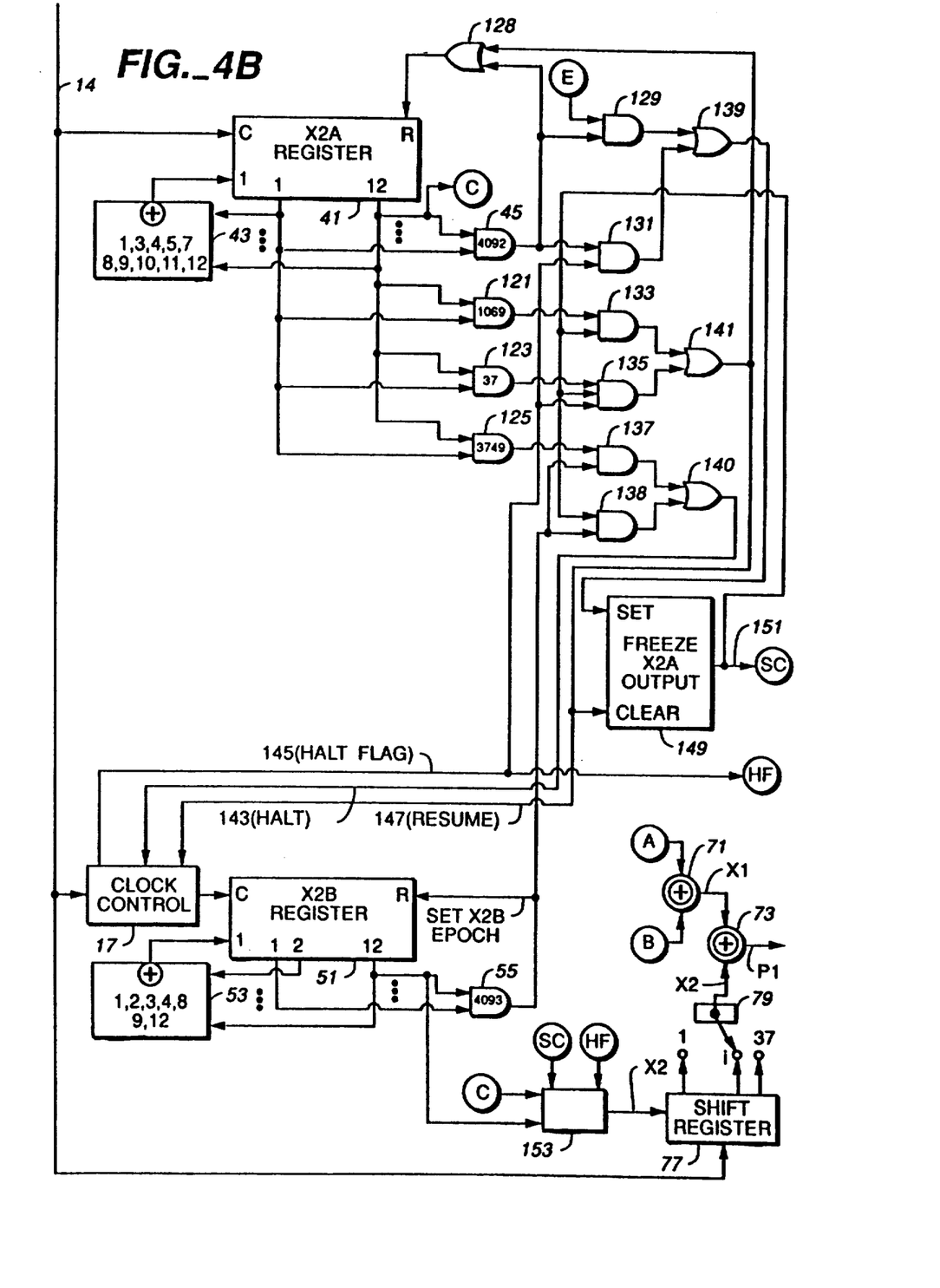

FIG. 4 illustrates an embodiment 111 of the invention, in which the four 12-bit counters 27, 37, 47 and 57, the dividers 37 and 67, the counter 61, the seven-day reset module 63, and the logic gates 65 and 69 that implement precession are removed and replaced by certain multi-state decoders and other devices. The information contained in the counters 27, 37, 47 and 57 is redundant: The same information, differently encoded, is available in the corresponding code configurations issued by the registers 21, 31, 41 and 51. For example, the X1B register 31 reaches the X1B final value, at a time t = 15,344,657 chips into that X1 period, 343 chips before the end of the X1A period. The X1B final state is reached in the 3749th period of the X1B signal. When this state is reached, the X1A signal will be in the 3749th chip number of its 3750th period. This combination of the X1A 3749th chip number and 4093rd X1B chip number occurs once per X1 period.

In the embodiment 111 shown in FIG. 4, the four 12-bit counters 27, 37, 47 and 57 are deleted. The 12 bits of the X1A code sequence are decoded by the X1A epoch decoder 25 and by a second 12-bit X1A decoder 113 that issues an output signal whenever it senses X1A chip number 3749, which occurs 343 chips before X1A chip number 4092, which defines the X1A epoch. The output signal from the second X1A decoder 113 is received by one of two input terminals of an AND gate 115. The other input terminal of the AND gate 115 receives the output signal issued by the X1B decoder 35 whenever the decoder 35 senses the presence of chip number 4093. The output signal from the AND gate 115 is received at the HALT terminal of the clock control module 13 on the signal line 40. The output signal from the first X1A decoder 25 is received at the reset terminal of the X1A register 21 as before, to indicate occurrence of an X1A epoch. The output signal from the decoder 25 is also received at one of two input terminals of an AND gate 29, whose other input terminal receives a signal on a signal line 117. The signal line 117 is attached to a HALT (counting) FLAG terminal of the clock control module 13 and carries a HALT Flag signal HF (high) whenever the module 13 has received a HALT signal and has not yet received a subsequent RESUME (counting) signal on the signal line 14. The two-input terminal AND gate 29 receives input signals from the X1A epoch decoder 25 and from the HALT FLAG line 117 and issues an output signal only when an X1 epoch occurs. This output signal serves as the "resume counting" signal received by the clock control module 13 on the signal line 30.

The X1B register 31 operates without the 12-bit counter 37 shown in FIG. 2. The output signal of the X1B epoch decoder 35 is received by the second input terminal of the AND gate 115 and is also used to reset the X1B register as before. The AND gate 115 issues an output signal only when the X1A register 21 is at chip number 3749 and the X1B register 31 completes 4093 chips.

In FIG. 4, the X2A register 41 now has four 12-bit decoders, 45 (chip 4092), 125 (chip 3749), 123 (chip 37), and 121 (chip 1069) associated with it. When the first X2A decoder 45 senses the occurrence of chip 4092, the decoder issues an output signal that is received by one of two input terminals of an OR gate 128, by one of two input terminals of an AND gate 129, and by one of two input terminals of an AND gate 131. The output signal of the OR gate 128 serves to reset the X2A register 41. The output signal from the second X2A decoder module 121, which occurs at chip number 1069, is received by one of two input terminals of an AND gate 133, whose output signal indicates end of the week. The output signal from the third X2A decoder module 123, which occurs at chip 37, is received by one of three input terminals of an AND gate 135, and the output signal from the fourth X2A decoder 125, which occurs at chip number 3749, is received by one of two input terminals of an AND gate 137. Another AND gate 138 receives signals, discussed below, at its two input terminals.

The output signals from the two AND gates 129 and 131 are received by two input terminals of an OR gate 139, whose output signal is received by a SET or enable (freeze) input terminal of a set/clear module 149. If the set/clear module 149 is set or enabled, the last bit of the 4092-chip X2A code sequence will be "frozen" at the data output terminal of a gated logic module 153 that produces the X2 code. The output signals from the two AND gates 133 and 135 are received by two input terminals of an OR gate 141, whose output signal is received at the CLEAR or disable terminal of the set/clear module 149. Receipt of the CLEAR signal by the module 149 causes the gated logic module 153 to become transparent again, until a SET signal is subsequently received, so that whatever X2A data value appears at a first data input terminal of the gated logic module 153 will also be issued as part of the output signal X2=X2A+X2B at the data output terminal of this module. The output signal SC issued by the set/clear module 149 is thus a set/clear control signal, namely the input signal received at the SET terminal (output signal=1) or at the CLEAR terminal (output signal=0), whichever was last received.

The output signal SC from the set/clear module 149 is received on a signal line 151 by a first control input terminal (SC) of the gated logic module 153. The output signal from the set/clear module 149 is also fed back and received by second input terminals of the AND gates 133, 135 and 138.

A sixth AND gate 138 receives two input signals from the X2B decoder 55 and from the set/clear module 149 on the signal line 151, and the output signals from the AND gates 137 and 138 are received by an OR gate 140. The output signal from the OR gate 140 is received at a "halt counting" terminal of the clock control module 17 on a HALT (counting) signal line 143. Receipt of this signal disables the clock control module 17 so that no further clock pulses arriving on the clock signal line 14 are passed through to the X2B register 51. The X2A register receives clock pulses directly on the clock signal line 14. When the clock control module 17 receives a HALT (counting) signal on the signal line 143, this module issues a HALT FLAG signal HF on the signal line 145, which signal is received by the AND gates 131 and 135 and by a second control input terminal (HF) of the gated module 153. The output signal from the OR gate 141 is also received by a second input terminal of the OR gate 128 and on signal line 147 at the RESUME (counting) terminal of the clock control module 17.

The fourth register's 12 bits are received from the register 51 by a 12-bit decoder 55 (chip 4093), and the output signal from this decoder is received at a second input terminal of each of the AND gates 137 and 138 and at the reset terminal of the X2B register 51.

One bit from each of the X2A and X2B register states is received at first and second data input terminals, respectively, of the gated logic module 153. The output signal issued by the gated module 153 is the X2 code and is determined by the truth table set forth in Table 1, where SC(t) and HF(t) denote the signal values carried on the signal lines 151 and 145, respectively, and X2B* is the logical complement of X2B.

TABLE 1

| Output Signals From Gated Logic Module. | | |
|---|---|---|
| SC(t) | HF(t) | X2(t) |
| 0 | 0 | X2A⊕X2B |
| 0 | 1 | X2A |
| 1 | 0 | X2B* |
| 1 | 1 | 1 |

This collection of four signals X2(t) may be generated from the four signals X2A(t), X2B(t), SC(t) and HF(t) by the logic relation $$X2(t) = [X2A(t) \cdot SC(t)^* + SC(t)] \oplus [X2B(t) \cdot \{HF(t)\}^*]. \quad (14)$$

Figure 5:
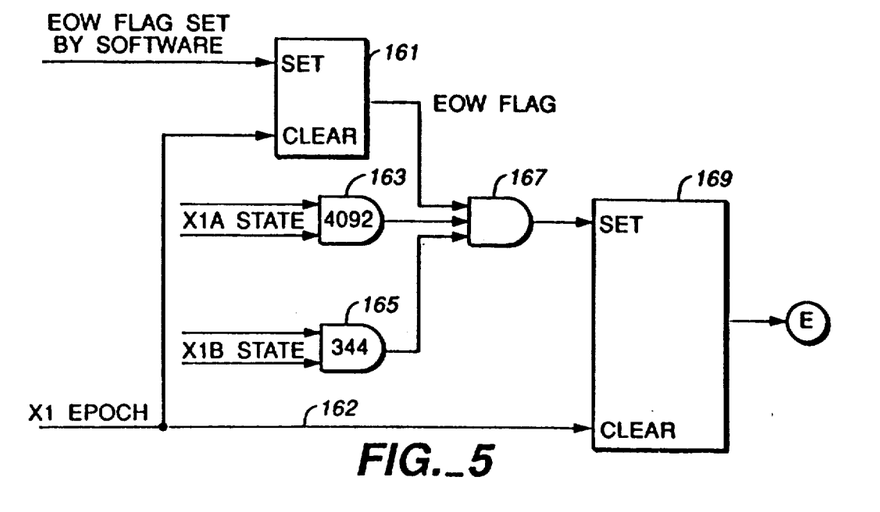

The AND gate 129 also receives an end-of-period input signal E(t) from a source denoted as "E" in FIG. 4. FIG. 5 illustrates one means of producing the signal E(t) received by the AND gate 129 from the source "E". Hardware that forms the end-of-period counter 61 in FIG. 2, used to count the number of X1 periods completed in a one-week period (maximum number of periods=403,200), may be replaced by system software that performs the same counting operation. The end-of-period sensing operation occurs at a relatively leisurely pace (0.667 Hz) and can therefore be implemented by software in a number of ways. Any of these ways can be used to generate the EOW signal used in the embodiment illustrated in FIG. 5. System software monitors the time during the week and sets an EOW flag signal, after 403,199 X1 epochs, during the last 1.5 seconds or last X1 period of the week. This EOW flag signal is received at a SET input terminal of a second set/clear module or latch 161 that also receives a CLEAR signal on a signal line 162 as each X1 epoch occurs. The 12 bits from the X1A and X1B code sequences are received at two 12-bit decoders 163 (chip 4092) and 165 (chip 344), respectively. The output signals from the latch 161 and from the two decoders 163 and 165 are received at three input terminals of an AND gate 167, and the output signal from the AND gate 167 is received at the SET input terminal of a third set/clear module or latch 169. The CLEAR input terminals of the first and second latches 161 and 169 each receive an X1 epoch signal on a signal line 162, as shown. This clears the set/clear modules 161 and 169 when the next X1 epoch signal arrives, at the end of the week. The output signal from the third set/clear module 169 is the signal E(t) received by one input terminal of the AND gate 129 from source "E" in FIG. 4, in this embodiment.

The AND gate 167 produces a pulse (high) that is one chip in length and occurs 4092 chips, or 400 μsec, before the end of the week (EOW). This sets the third set/clear module 169 so that the signal E(t) produced at the source "E" goes high during this onechip interval. The set/clear modules 161 and 169 are then cleared or reset (from high to low) at the end of the week. The output signal from the decoder 45 for the third or X2A register 41, which occurs every 4092 chips, and the signal E(t) are received by the AND gate 129, and the output signal of the AND gate 129, and thus the output signal of the OR gate 139, goes high for a time interval of length one chip; this pulse occurs $\Delta t_1 = 1069$ chips immediately preceding the end of the week. The length $\Delta t_1 = 1069$ chips is determined by the relation 15,345,000 chips−(37 chips)×403,199=(4092 chips)×104+1069 chips. Because the OR gate 139 also receives an input signal from the AND gate 131, the output signal from the OR gate 139 also goes high to initiate the precession of X2B(t) relative to X2A(t) during the last 37 chips of each X2 period, corresponding to precession of X1 code relative to X2 code at the end of each X1 period. Optionally, the decoder 163 can be deleted and the output signal can be replaced by the output signal of the X1A decoder 25.

Figure 6:
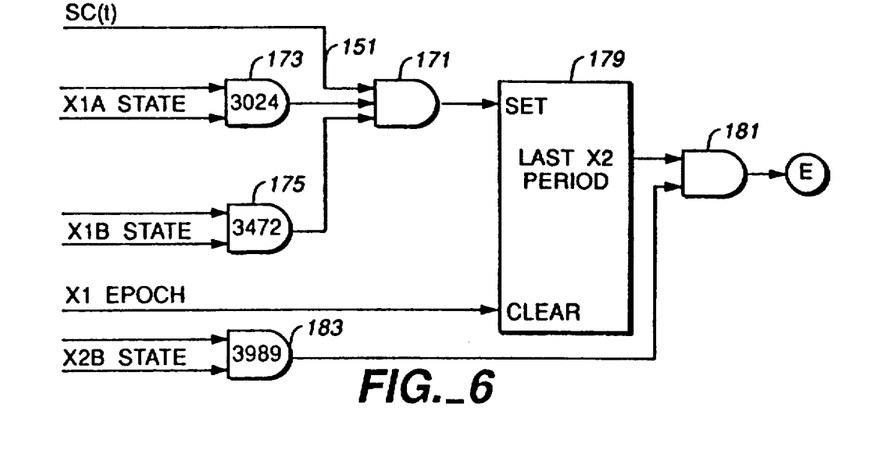

A second apparatus for producing a related signal E(t)' is illustrated in FIG. 6 and is implemented entirely in hardware. Here, presence of the last complete X2 period is sensed by feeding a signal SC(t), issued by the set/clear module 149 on the signal line 151, to the first of three input terminals of an AND gate 171. An X1A decoder 173 (chip 3024) and an X1B decoder 175 (chip 3472) produce output signals that are received at the second and third terminals of the AND gate 171. The output signal of the AND gate 171 is received by a SET input terminal of a second set/clear module 179. A CLEAR input terminal of the second set/clear module 179 receives an X1 epoch signal on the signal line 30, indicating occurrence of the end of the week if the second set/clear module 179 is already SET by the output signal received from the AND gate 171. The output signal of the second set/clear module 179 is received by one of two input terminals of an AND gate 181. An X2B decoder 183 (chip 3989) issues an output signal that is received by a second input terminal of the AND gate 181. The output signal from the AND gate 181 is the signal E(t)' received by the AND gate 129 shown in FIG. 4.

Occurrence of a high value of the signal SC(t) on the signal line 151 and of the X1A chip number 3024 and of the X1B chip number 3472 marks the end of the last complete X2 period of the week, which is 15,345,000 chips−(37 chips)×403,199=426,637 chips before the end of the week. The second set/clear module 179 will be set, and its output signal will go high, at that time, during the last (incomplete) X2 period of the week. The output signal from the second set/clear module 179 is ANDed together with the output signal from an X2B decoder 183 (chip 3989) to produce a one-chip high pulse as the signal E(t)'. Although the signals E(t) and E(t)' produced by the apparati illustrated in FIGS. 5 and 6, respectively, are not high for precisely the same time interval, the output signal produced by the AND gate 129 is the same for both E(t) and E(t)'.

We discovered that, during the last 37 pulse periods of the last complete X2 period of a one-week time interval, at least one unique code sequence member $X_L$ occurs in the combined X1A and X1B code sequences; occurrence of the code sequence number $X_L$ during the last 37 chips of a complete X2 period does not occur at any other time during the week. One such code sequence member $X_L$ (not necessarily the only one) is 3dd 182, when expressed in hexadecimal notation for each of the X1A and X1B code sequences, and the code sequence member $X_L$ occurs at a different position number j (j = 1, 2, ..., 37) among the 37 positions for each of the 37 P-code sequences P(t; m) (m = 1, 2, ..., 37). However, any code sequence member $X_L$ that appears precisely once in each of the code sequences corresponding to the different satellites m = 1, 2, ..., 37, at or near the end of the week's sequence, may be used for this purpose. The code sequence member $X_L$ appears when the X1A register is in its 3024th chip and the X1B register is in its 3472th chip. The code sequence member $X_L$ is identified by the X1A and X1B decoders 173 and 175 and the subsequent AND gate 171 in the apparatus shown in FIG. 6.

Figure 7A:
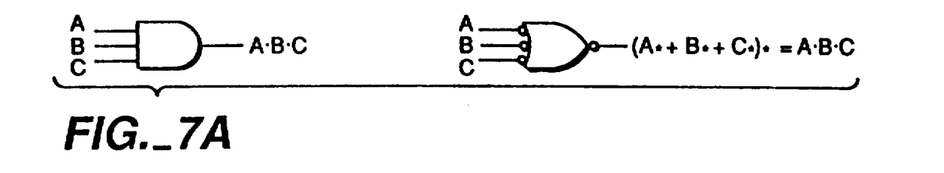
FIGS. 7A and 7B illustrate formally equivalent logic gates that may replace the AND gates and the OR gates, respectively, used in FIGS. 3-6.
Figure 7B:
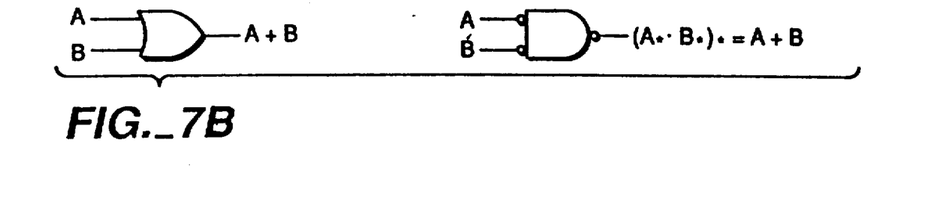

Each of the AND gates 29, 39, 49, 59, 65, 115, 129, 131, 133, 135, 137, 138, 167, 171, and 181 shown in FIGS. 3–6 may be replaced by its formally equivalent logic gate, a NOR gate with inverted input signals, as indicated in FIG. 7A. Each of the OR gates 48, 58, 69, 128, 139, 140 and 141 shown in FIGS. 3–4 may be replaced by its formally equivalent logic gate, a NAND gate with inverted input signals, as indicated in FIG. 7B.

We claim:

1. Apparatus for generation of a code sequence P(t) as a function of time t for use in determining position on a surface of a body such as the Earth from position data provided from one or more satellites, the apparatus comprising:

a clock pulse source that provides a sequence of clock pulses of predetermined period T;

first clock control means having a clock pulse input terminal and a clock pulse output terminal, for receiving the sequence of clock pulses at the input terminal and passing through and issuing this sequence of clock pulses at the output terminal, the first clock control means further having a first control input terminal for halting pass-through of clock pulse sequences when a halt signal is received at this first control input terminal, and having a second control input terminal for resuming pass-through of clock pulse sequences when a reset signal is received at the second control input terminal after receipt of a halt signal at the first control input terminal;

second clock control means having a clock pulse input terminal and a clock pulse output terminal, for receiving the sequence of clock pulses at the input terminal and passing through and issuing this sequence of clock pulses at the output terminal, the second clock control means further having a first control input terminal for halting pass-through of clock pulse sequences when a halt signal is received at this first control input terminal, having a second control input terminal for resuming pass-through and issuance of clock pulse sequences when a reset signal is received at the second control input terminal after receipt of a halt signal at the first control input terminal;

third clock control means having a clock pulse input terminal and a clock pulse output terminal, for receiving the sequence of clock pulses at the input terminal and passing through and issuing this sequence of clock pulses at the output terminal, the third clock control means further having a first control input terminal for halting pass-through of clock pulse sequences when a halt signal is received at this first control input terminal, and having a second control input terminal for resuming pass-through of clock pulse sequences when a reset signal is received at the second control input terminal after receipt of a halt signal at the first control input terminal;

first, second, third and fourth register means that receive a clock pulse sequence from the first clock control means, from the clock pulse source, from the second clock control means and from the third clock control means, respectively, and generate and issue a predetermined code sequence X1B(t), X1A(t), X2A(t) and X2B(t), respectively, for each clock pulse received at a sequence of times t = mT (m = 1, 2, ...);

first decoder means, connected to the first register means, for receiving the code sequence values X1B(t) (t = $m_1$T; $m_1$ = 1, 2, ... M1) issued by the first register means, for detecting occurrence of a predetermined code sequence value X1B0, and for producing and issuing a first halt signal that is received by the first control input terminal of, and halts the pass-through of clock pulses at, the first clock control means when the predetermined code sequence value X1B0 is received, where M1 is a predetermined positive integer;

second decoder means, connected to the second register means, for receiving the code sequence values X1A(t) (t = $m_2$T; $m_2$ = 1, 2, ... M2) issued by the second register means, for detecting occurrence of a predetermined code sequence value X1A0, and for producing and issuing a first reset signal that is received by the second control input terminal of, and resumes the pass-through and issuance of clock pulses at, the first clock control means when the predetermined code sequence value X1A0 is received, where M2 is a predetermined positive integer;

third decoder means, connected to the third register means, for receiving the code sequence values X2A(t) (t=$m_3$T; $m_3$=1, 2, . . . M3) issued by the third register means, for detecting occurrence of a predetermined code sequence value X2A0, and for producing and issuing a first halt signal that is received by the first control input terminal of, and halts the pass-through of clock pulses at, the second clock control means when the predetermined code sequence value X2A0 is received, where M3 is a predetermined positive integer;

fourth decoder means, connected to the fourth register means, for receiving the code sequence values X2B(t) (t=$m_4$T; $m_4$=1, 2, . . . M4) issued by the fourth register means, for detecting occurrence of a predetermined code sequence value X2A0, and for producing and issuing a first halt signal that is received by the first control input terminal of, and halts the pass-through of clock pulses at, the third clock control means when the predetermined code sequence value X2B0 is received, where M4 is a predetermined positive integer;

a period counter that receives and counts the number of first reset signals issued by the second decoder means, that issues a first period counter output signal when this count has reached a fifth predetermined integer M5-1, and that issues a second period counter output signal when this count has reached the integer M5 precession means for receiving a sequence of clock pulses from the clock pulse source, for receiving output signals from the third decoder means and from the fourth decoder means, and for receiving the first and second period counter output signals, for counting a predetermined number M6 of clock pulses, after receipt of a predetermined output signal from the third decoder means, and after receipt of a predetermined output signal from the first period counter, and for then issuing a second reset signal that is received by and commands the second clock control means and the third clock control means to resume pass-through and issuance of the sequence of clock pulses;

first logic means for receiving the first and second code sequences X1B(t) and X1A(t) and for forming and issuing an Exclusive-Or combination signal X1(t)=X1B(t) $\oplus$ X1A(t) as an output signal;

second logic means for receiving the third and fourth code sequences X2A(t) and X2B(t) and for forming and issuing a time delayed Exclusive-Or combination signal X2(t)=X2A(t−KT) $\oplus$ X2B(t−KT) as an output signal, where K is a predetermined non-negative integer;

third logic means for receiving the code sequence signal X1(t) and X2(t) and for forming and issuing an Exclusive-Or combination signal P(t)=X1(t) $\oplus$ X2(t);

where the third register means and the fourth register means include a first latch with a first latch choice input terminal and a second latch with a second latch choice input terminal, respectively, that allows a choice of the contents of the first and second register means, respectively, from among M6 different initial code sequence values for the third register means and from among M7 different code sequence values for the fourth register means, where M6 and M7 are predetermined positive integers.

2. The apparatus of claim 1, wherein said integer M5 is equal to 604,800 seconds divided by the product of said integer M2 and said period T.

3. The apparatus of claim 1, wherein said integers M1 and M4 are equal and wherein said integers M2 and M3 are equal.

4. The apparatus of claim 3, wherein said integers M1 and M4 are equal to 15,344,667 and said integers M2 and M3 are equal to 15,345,000.

5. The apparatus of claim 1, wherein said integers M6 and M7 are each equal to 37.

6. Apparatus for generation of a code sequence P(t) as a function of time t for use in determining position on a surface of a body such as the Earth from position data provided from one or more satellites, the apparatus comprising:

a clock pulse source that provides a sequence of clock pulses of predetermined period T;

first clock control means having a clock pulse input terminal and a clock pulse output terminal, for receiving the sequence of clock pulses at the input terminal and passing through and issuing this sequence of clock pulses at the output terminal, the first clock control means further having a first control input terminal for halting pass-through of clock pulse sequences when a halt signal is received at this first control input terminal, and having a second control input terminal for resuming pass-through of clock pulse sequences when a reset signal is received at the second control input terminal after receipt of a halt signal at the first control input terminal;

second clock control means having a clock pulse input terminal and a clock pulse output terminal, for receiving the sequence of clock pulses at the input terminal and passing through and issuing this sequence of clock pulses at the output terminal, the second clock control means further having a first control input terminal for halting pass-through of clock pulse sequences when a halt signal is received at this first control input terminal, having a second control input terminal for resuming pass-through and issuance of clock pulse sequences when a reset signal is received at the second control input terminal after receipt of a halt signal at the first control input terminal, and having a control output terminal for issuing a predetermined halt flag signal HF(t) when a halt flag signal has been received at the first control input terminal and a reset signal has not yet been subsequently received at the second control input terminal;

first, second, third and fourth register means that receive a clock pulse sequence from the first clock control means, from the clock pulse source, from the second clock control means and from the third clock control means, respectively, and generate and issue a predetermined code sequence X1B(t), X1A(t), X2A(t) and X2B(t), respectively, for each clock pulse received at a sequence of times t=mT (m=1, 2, . . . );

first decoder means, having a plurality of input terminals and a plurality of output terminals and being connected to the first register means and to the second register means, for receiving the code sequence values X1B(t) (t=m₁T; m₁=1, 2, ... M1) issued by the first register means, for receiving the code sequence values X1A(t) (t=m₂T; m₂=1, 2, ... M2) issued by the second register means, for detecting receipt of a predetermined code sequence value X1B0 from the first register means, for detecting receipt of a predetermined code sequence value X1A0 from the second register means, for producing and issuing a first halt signal that is received by the first control input terminal of, and halts the pass-through of clock pulses at, the first clock control means when the predetermined code sequence value X1B0 is received, and for producing and issuing a first reset signal that is received by the second clock control input terminal of, and resumes the pass-through and issuance of clock pulses at, the first clock control means when the predetermined code sequence X1A0 is received, where M1 and M2 are predetermined positive integers;

second decoder means, having a plurality of input terminals and a plurality of output terminals and being connected to the third register means and to the fourth register means, for receiving the code sequence values X2A(t) (t=m₃T; m₃=1, 2, ..., M3) issued by the third register means, for detecting receipt of a predetermined code sequence value X2A0 or of a predetermined code sequence value X2A1 from the third register means, for receiving the code sequence values X2B(t) (t=m₄T; m₄=1, 2, ..., M4) issued by the fourth register means, for detecting receipt of a predetermined code sequence value X2B0 or of a predetermined code sequence value X2B1 from the fourth register means, for predetermined positive integers M3 and M4 with M3>M4, for receiving the halt flag signal HF(t), for issuing at a first output terminal a second halt signal that is received by the first control input terminal of, and halts the pass-through of clock pulses at, the second clock control means when the predetermined code sequence value X2B0 or X2B1 is received from the fourth register means, for issuing at a second output terminal a second reset signal that is received by the second control input terminal of, and resumes the pass-through and issuance of clock pulses at, the second clock control means when the predetermined code sequence value X2A0 or X2A1 is received from the third register means, and for issuing at a third output terminal a set/clear control signal SC(t), which has a first predetermined value when m₃=M3−k (k=1, 2, ..., M5; M5 a predetermined positive integer) at a time preceding receipt of each of said second reset signals by said second clock control means, and which has a second predetermined value otherwise;

gated logic means, having four input terminals and an output terminal, for receiving the code sequences X2A(t) and X2B(t) at the first and second input terminals, for receiving the halt flag signal HF(t) at a third input terminal, for receiving the set/clear signal SC(t) at the fourth input terminal, and for producing and issuing at its output terminal an output signal X2(t) that is equal to X2A(t) ⊕ X2B(t) when HF(t)=0 and SC(t)=0, that is equal to X2A(t) when HF(t)=1 and SC(t)=0, that is equal to X2B(t)* when HF(t)=0 and SC(t)=1, and that is equal to 1 when HF(t)=1 and SC(t)=1;

first logic means, having two input terminals and an output terminal, for receiving the first and second code sequences X1B(t) and X1A(t) at its input terminals and for forming and issuing an Exclusive-Or combination X1(t)=X1B(t) ⊕ X1A(t) at its output terminal;

time delay means, having two input terminals and an output terminal, for receiving the signal X2(t) at its first input terminal and for receiving a positive integer M6 at its second input terminal, and for forming and issuing a time delayed output signal X2(t-(M6)T) at its output terminal;

second logic means, having two input terminals and an output terminal, for receiving the signals X1(t) and X2(t-(M6)T) at its input terminals and for forming and issuing a signal P(t)=X1(t) ⊕ X2(t-(M6)T) at its output terminal; and sequence choice means, connected to the second input terminal of the time delay means, for selecting the integer M6.

7. The apparatus of claim 6, wherein said integers M1 and M4 are equal and said integers M2 and M3 are equal.

8. The apparatus of claim 6, wherein said integers M1 and M4 are equal to 15,344,667 and said integers M2 and M3 are equal to 15,345,000.

9. The apparatus of claim 6, wherein said integer M6 is drawn from the set of consecutive integers consisting of the integers 1, 2, ..., 37.

10. The apparatus of claim 6, wherein said gated logic means comprises logic apparatus that forms said signal X2(t) according to the relation $X2(t) = [X2A(t) \cdot SC(t)^* + SC(t)] \oplus [X2B(t) \cdot \{HF(t)\}^*]$.

11. The apparatus of claim 6, wherein said second decoder means comprises:

a first state decoder that receives said code sequence X2A(t) and issues a first state output signal when said signal X2A(t) reaches a predetermined first state value;

a second state decoder that receives said code sequence X2A(t) and issues a second state output signal when said signal X2A(t) reaches a predetermined second state value;

a third state decoder that receives said code sequence X2A(t) and issues a third state output signal when said signal X2A(t) reaches a predetermined third state value;

a fourth state decoder that receives said code sequence X2A(t) and issues a fourth state output signal when said signal X2A(t) reaches a predetermined fourth state value;

a fifth state decoder that receives said code sequence X2B(t) and issues a fifth state output signal when said signal X2B(t) reaches a predetermined fifth state value;

a first AND gate, having two input terminals and an output terminal, that receives the first state signal and a signal E(t) at its two input terminals and produces and issues the logical product of these two signals at its output terminal;

a second AND gate, having two input terminals and an output terminal, that receives the first state signal and said halt flag signal HF(t) at its two input terminals and produces and issues the logical product of these two signals at its output terminal;

a third AND gate, having two input terminals and an output terminal, that receives the second state signal and said set/clear signal SC(t) at its two input terminals and produces and issues the logical product of these two signals at its output terminal;

a fourth AND gate, having three input terminals and an output terminal, that receives the third state signal and said halt flag signal HF(t) and said set/clear signal SC(t) at its three input terminals and produces and issues the logical product of these three signals at its output terminal;

a fifth AND gate, having two input terminals and an output terminals, that receives the fourth state signal and the fifth state signal at its two input terminals and produces and issues the logical product of these two signals at its output terminal;

a sixth AND gate, having two input terminals and an output terminal, that receives the fifth state signal and said set/clear signal SC(t) at its two input terminals and produces and issues the logical product of these two signals at its output terminal;

a first OR gate, having two input terminals and an output terminal, that receives the output signals from the first and second AND gates at its input terminals and produces and issues the logical sum of these two input signals at its output terminal;

a second OR gate, having two input terminals and an output terminal, that receives the output signals from the third and fourth AND gates at its input terminals and produces and issues the logical sum of these two input signals at its output terminal;

a third OR gate, having two input terminals and an output terminal, that receives the output signals from the fifth and sixth AND gates at its input terminals and produces and issues the logical sum of these two input signals at its output terminal, where the output signal from this third OR gate serves as said halt signal received by said second clock control means;

a set/clear module, having two input terminals and an output terminal, that receives the output signals from the first and second OR gates at its first and second input terminals, respectively, and that produces and issues at its output terminal said set/clear signal SC(t) that is equal to the signal that was received most recently in time at its first or second input terminal;

a fourth OR gate, having two input terminals and an output terminal, that receives the output signals from the first state decoder and from the second OR gate at its input terminals and produces and issues the logical sum of these two input signals at its output terminal, where the output signal from this fourth OR gate is received by and reinitializes said third register means; and second gated logic means, having a plurality of input terminals and an output terminal, for receiving said first reset signal, and for receiving said first and second code sequence signals X1B(t) and X1A(t), and for producing and issuing a signal E(t) that changes from a first predetermined gated logic value to a second predetermined logic value at least once during a predetermined time interval that immediately precedes the end of a period of operation of the apparatus.

12. The apparatus of claim 11, wherein said first state value is 4,092.

13. The apparatus of claim 11, wherein said second state value is 1,069.

14. The apparatus of claim 11, wherein said third state value is 37.

15. The apparatus of claim 11, wherein said fourth state value is 3,749.

16. The apparatus of claim 11, wherein said fifth state value is 4,093.

17. The apparatus of claim 11, wherein said second gated logic means comprises:

a second set clear module, having first and second input terminals and an output terminal, that receives said first reset signal and said signal EOW(t) at its first and second terminals, respectively, and that produces and issues at its output terminal an end-of-period flag signal EOWF(t) that is equal to the signal that was received most recently in time at the first or second input terminal;

a sixth state decoder that receives said code sequence X1A(t) and issues a sixth state output signal when said signal X1A(t) reaches a predetermined sixth state value;

a seventh state decoder that receives said code sequence X1B(t) and issues a seventh state output signal when said signal X1B(t) reaches a predetermined seventh state value;

a seventh AND gate, having three input terminals and an output terminal, that receives the sixth state output signal and the seventh state output signal and the signal EOWF(t) at its three input terminals and produces and issues the logical product of these three signals at its output terminal as said signal E(t).

18. The apparatus of claim 17, wherein said predetermined sixth state value is 4,092.

19. The apparatus of claim 17, wherein said predetermined seventh state value is 344.

20. The apparatus of claim 11, wherein said second gated logic means comprises:

a sixth state decoder that receives said code sequence X1A(t) and issues a sixth state output signal when said signal X1A(t) reaches a predetermined sixth state value;

a seventh state decoder that receives said code sequence X1B(t) and issues a seventh state output signal when said signal X1B(t) reaches a predetermined seventh state value;

an eighth state decoder that receives said code sequence X2A(t) and issues an eighth state output signal when said signal X2A(t) reaches a predetermined eighth state value;

a seventh AND gate, having three input terminals and an output terminal, that receives the sixth state output signal, the seventh state output signal and said signal SC(t) at its three input terminals and produces and issues the logical product of these three signals at its output terminal;

a second set/clear module, having first and second input terminals and an output terminal, that receives said first reset signal and the output signal from the seventh AND gate at its first and second terminals, respectively, and that produces and issues at its output terminal an output signal SC1(t) that is equal to the signal that was received most recently in time at the first or second input terminal;

an eighth AND gate, having two input terminals and an output terminal, that receives the output signal from the eighth AND gate and the signal SC1(t) at its two input terminals and produces and issues the logical product of these two signals at its output terminal as said signal E(t).

21. The apparatus of claim 20, wherein said predetermined sixth state value is 3,024.

22. The apparatus of claim 20, wherein said predetermined seventh state value is 3,472.

23. The apparatus of claim 20, wherein said predetermined eighth state value is 3,989.

24. The apparatus of claim 19, wherein said sixth and seventh state decoders and said seventh AND gate together identify occurrence of a unique combined code sequence number (X1A, X1B)=(3dd, 182), when expressed in hexidecimal notation, within the last 37 clock pulses of the last complete period of said code sequence $X2(t)$.

* * * * *